June 23, 1959 — D. B. GRABLE ET AL — 2,891,342
NET TYPE FISHING APPARATUS
Filed May 6, 1957
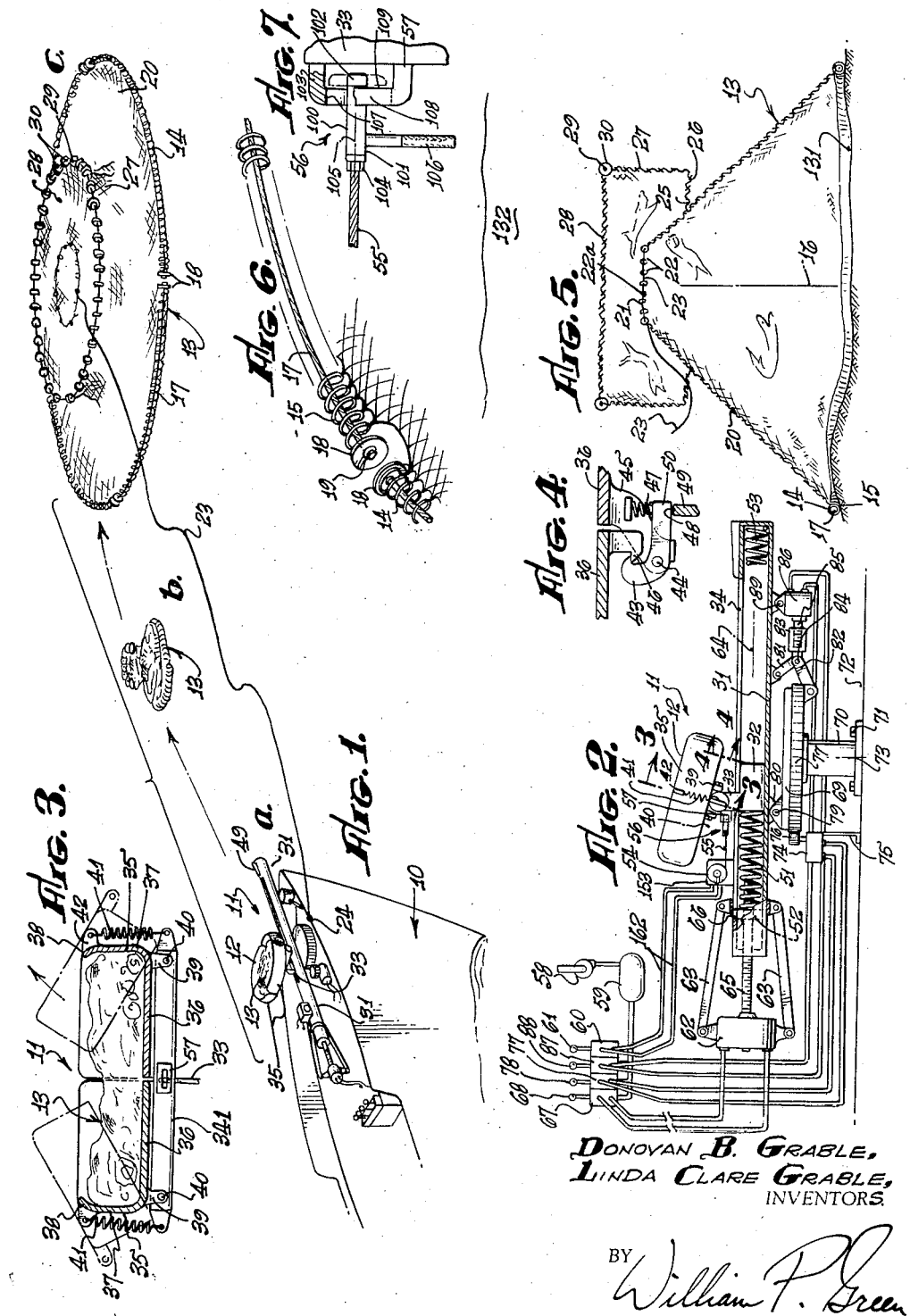
DONOVAN B. GRABLE,
LINDA CLARE GRABLE,
INVENTORS.
BY William P. Green
ATTORNEY

United States Patent Office 2,891,342
Patented June 23, 1959

2,891,342

NET TYPE FISHING APPARATUS

Donovan B. Grable and Linda Clare Grable,
Long Beach, Calif.

Application May 6, 1957, Serial No. 657,232

7 Claims. (Cl. 43—8)

This invention relates to improved fishing equipment of the type in which a net is utilized for entrapping the fish.

In fishing with a net, the customary procedure is to manually throw the net (which is usually rather large and heavy) from a boat and into the water, and to then subsequently pull in the net to recover the fish caught therein. A major disadvantage of this procedure has been the very great amount of physical exertion which is involved in manually throwing the rather heavy nets into the water in a manner such that they will entrap fish. As a result of this strenuous type of work which is involved, the number of casts which can be made in a given length of time is very limited, and as a result the overall net fishing procedure is relatively inefficient and limited.

The general object of the present invention is to provide an improved type of fishing net apparatus which is so designed as to eliminate the above discussed strenuous physical exertion, and to allow casting of a net with minimum effort. For this purpose, we utilize a special gun structure which is capable of mechanically ejecting the net from a boat or other carrier structure to fall into the water at a desired location near the boat. The net utilized with this gun structure is collapsible to a reduced dimension condition, and is held by the gun in that condition, and then expands to an increased dimension and in active condition after ejection. The net may be designed to automatically expand to the enlarged condition as a result of the construction of the net itself, and preferably by virtue of the provision of spring means in the net unit tending to expand it. These spring means may consist of one or more coil springs attached to and extending along the periphery of the net.

Desirably, the net contains a compartment within which the fish may be entrapped, and adapted to be closed by pulling a specially provided draw string after the net is in the water. The draw string may be actuable by pulling a line which remains attached to the boat, with that line also being usable for subsequently pulling in the net to recover the fish.

The gun structure preferably includes a holding mechanism adapted to receive and hold the net in its collapsed condition, and to then release the net for ejection toward the water. The holding mechanism may consist of a plurality of parts or sections which are relatively movable between net holding and released positions, and which desirably form together a tub or receptacle within which the net can be contained. The actuation of these sections to released positions may function to free the collapsed net structure for rapid escape from the receptacle and simultaneous expansion of the net, all by virtue of the built-in spring force of the net structure.

In association with the net holding tub or mechanism, there may be provided mechanism for rapidly moving the tub in a direction to impart kinetic energy or momentum to the net, so that when the net is released at or near the end of the tub movement, the kinetic energy of the net causes it to be thrown for a considerable distance over the water. Such movement of the tub may be effected by a firing spring, which is compressed by suitable power mechanism to cock the gun prior to firing. Additional control mechanism, preferably fluid actuated, may be provided for aiming and controlling the firing range of the gun.

The above and other features and objects of the present invention will be better understood from the following detailed description of the typical embodiment illustrated in the accompanying drawing in which:

Fig. 1 shows the bow of a fishing boat, with the present fishing apparatus mounted thereon;

Fig. 2 is an enlarged side view, partially broken away, of the Fig. 1 apparatus;

Fig. 3 is a further enlarged section taken on line 3—3 of Fig. 2;

Fig. 4 is an enlarged fragmentary section taken on line 4—4 of Fig. 2;

Fig. 5 is a vertical section through the net as it appears in the water;

Fig. 6 is an enlarged fragmentary perspective view of the peripheral portion of the net, and Fig. 7 is an enlarged fragmentary view showing the releasable hold-back latch element of the gun mechanism.

Referring first to Fig. 1, the bow of a fishing boat is shown at 10, with a net ejecting gun 11 embodying the invention being mounted on the boat. Gun 11 includes a receptacle or tub 12 which is adapted to receive the net 13 in a collapsed small dimension condition of the net. The gun is designed to actuate tub 12 in a manner to throw the net 13 outwardly from the gun and over the water, to fall down in the water at a location spaced from the boat and thus entrap fish beneath the net. After leaving tub 12, the net commences to open to the expanded condition shown in the upper righthand corner of Fig. 1, and is desirably completely expanded or opened by the time the net hits the water.

The construction of the particular type of net which is shown in the figures will probably be best understood by reference to Fig. 5. It will be apparent, however, that certain details of this net structure may be varied in order to adapt the net for best handling various different types of fish which may be sought. This net which is shown in the figures has a circular peripheral edge 14, which is normally urged to the opened or expanded circular condition of Figs. 1 and 5 by four complementary coil springs 15. Each of these coil springs extends along the periphery of net 13 through 90 circular degrees, with this and successive portions of the net being attached to successive turns of the coil springs as seen best in Fig. 6. Each of the springs normally assumes an arcuate configuration, so that when the net is released from its collapsed condition, the four springs 15 hold the peripheral edge of the net in the condition shown in Fig. 5 in which the four springs are centered about the main axis 16 of the net.

Extending through the four coil springs 15 respectively, there are provided four flexible cables or wire lines 17, having circular discs 18 disposed about the cables 17 at the opposite ends of each of the springs 15. The discs 18 are of a diameter somewhat greater than the diameter of the individual coils of springs 15, so that the opposite ends of each spring 15 will be held by discs 18 against movement axially beyond the associated cable 17. In order to hold the discs themselves against movement axially off of cables 17, each of the cables has at its opposite ends, and beyond discs 18, a pair of enlargements or heads 19, which are larger than the openings within discs 18 through which cable 17 passes, to thus hold the discs and springs on the cables 17 between enlargements 19. Desirably, springs 15 are always under some compression, even in the fully opened condition of the net.

With reference again to Fig. 5, the flexible woven net material of net structure 13 has an essentially conical portion 20 tapering upwardly and inwardly from springs 15 to a small normally circular upper opening 21, which may be considered as being centered about axis 16. About this opening 21, the conical portion of the net may carry a series of circularly spaced typically metal eyelets 22, through which a draw cord or draw string 23 may extend circularly about axis 16. One end of this draw string 23 may be attached tightly to one of the eyelets 22a, so that the string 23 may then pass through all of the other eyelets and circularly about axis 16 to ultimately pass from the final eyelet and out through the net to its exterior. The outer end of this cord 23 is then attached to the boat as at 24, so that the opening 21 may be closed from the boat by pulling on cord 23.

Extending from a vertically intermediate portion of the conical part 23 of the net, there is an annular upper portion of the net which extends from a location 25 first outwardly at 26, and then upwardly at 27, and finally horizontally inwardly across the top of the rest of the net at 28. About the periphery of this upper circular portion 28, the net is attached to a circular cable or line 29, having a series of evenly circularly spaced floats 30 (typically cork floats) attached to line 29. Thus, floats 30 cause the upper portion of the net to normally assume the condition shown in Fig. 5. The springs and cables 15 and 17 are heavy enough to cause the entire net to gradually fall downwardly within the water to the floor 131 of the ocean or other body of water 132. During each falling movement, however, the buoyancy of floats 30 holds the upper end of the net well above the springs 15 and cables 17.

The tub 12 of gun mechanism 11 is movably mounted by an elongated hollow cylindrical rigid member 31, which functions essentially as a cylinder within which an externally cylindrical piston or plunger member 32 is axially movable. Plunger 32 rigidly carries an upwardly projecting arm 33, which slides axially within an elongated axial slot 34 formed along the upper side of member 31. Arm 33 carries at its upper end a transverse member 341, to whose opposite ends are pivotally mounted a pair of essentially semi-cylindrical halves or sections 35 of net receiving tub 12. More specifically, each of these sections 35 of the tub has a transverse semi-circular bottom wall 36, and an upstanding essentially semicylindrical sidewall 37 whose upper edge 38 is turned or curved inwardly as seen in Fig. 3 to hold the net within the tub.

Projecting downwardly from their undersides, the two sections 35 of the tub have lugs 39, which are pivotally attached to member 34 to mount the sections 35 for swinging movement in opposite directions and to the broken line positions of Fig. 3 relative to member 341. This swinging movement of sections 35 is about two parallel spaced axes 40 which extend in essentially the same direction as the axis of member 31, but are inclined somewhat with respect to that axis (see Fig. 2). Sections 35 are yieldingly urged from their Fig. 3 full line positions to their Fig. 3 broken line positions by means of a pair of springs 41, which are attached at their opposite ends to member 34 and a pair of lugs 42 on tub sections 35. The sections 35 are releasably held against such movement from their Fig. 3 full line positions by means of a latch structure shown in Fig. 4, which includes a latch element 43 pivoted at 44 to a part 45 projecting downwardly from the bottom wall 36 of one of the sections 35. Latch element 43 is engageable with a coacting holding lug 46 projecting downwardly from the bottom wall 36 of the other tub section 35, so that when the latch parts are in the Fig. 4 holding position, they retain tub sections 35 in their Fig. 3 full line positions. A coil spring 47 urges latch element 43 to its Fig. 4 active position. This latch element 43 is released automatically when tub 12 reaches the final portion of an outward net firing movement, such releasing action being effected by engagement of the inclined upper camming surface 48 of a cam element 49 with the underside of a portion 50 of latch part 43. Cam 49 is rigidly attached to member 31 at a location to engage latch element 43 at the proper instant during a firing action.

Plunger 32 and the attached tub structure 12 are adapted to be rapidly moved forwardly (to the right as seen in Fig. 2) by means of a coil spring 51 contained within member 31 and maintained under compression between member 32 and an adjustable backing plunger 52. At the forward end of its stroke, plunger 32 may engage a short coil spring 53, which is contained within the end of member 31 and acts as a decelerating or buffer spring 53. The plunger and tub are retracted to the Fig. 2 cocked position, prior to each firing operation, by any suitable type of power equipment, such as a pneumatically operated winch 153 whose power driven winding drum 54 is attached to one end of a line 55 and acts to wind that line on drum 54 when the winch is energized. The opposite end of line 55 is attached to a releasable latch or holding unit 56, which releasably engages coacting element 57 on member 33. Referring more particularly to Fig. 7, this latch unit 56 may include a T shaped holding part 100 having a portion which normally extends parallel to axis 64, and having a cross head 102 engageable with an essentially U-shaped member 103 attached to element 33. Part 100 is attached to flexible cable 55 by a swivel connection 104, which allows rotation of part 100 about axis 105 relative to the cable and between the full line holding position of Fig. 7 and the released broken line position of that figure. Such rotation of part 100 through approximately 90 circular degrees, between the defined positions, is effected by a handle 106 attached to part 100. In the released position of part 100, head 102 is able to pass through an elongated slot 107 in cross piece 108 of part 103, to free the member 33 and tub for forward firing movement. In the full line holding position of head 102, the head is engageable rearwardly against surfaces 109 on part 103 at opposite sides of slot 107, to releasably attach cable 55 to the tub structure for cocking the gun by actuation of winch 153.

The fluid operated winch 153, as well as the other later to be described fluid actuated control mechanisms, may be supplied with pressure fluid from any suitable source of supply, typically represented as an air compressor 58 filling compressed air into an accumulator chamber 59. From accumulator chamber 59, air may flow to a control valve 60, actuated by a control handle 61, which valve constitutes a reverse valve capable of supplying pressure fluid selectively to unit 153 through either of two lines 162, with discharge air returning through the other of these lines for ultimate discharge to the atmosphere. Thus, manually operated control element 61 may be actuated to supply fluid to winch 153 for driving it in either rotary direction. It will of course be apparent that if desired, a hydraulic system or any other suitable control system can be substituted for the discussed pneumatic arrangement.

The compression of spring 51 at the time of firing may be regulated by adjustment of plunger 52 axially of member 31. For this purpose, we preferably provide a pneumatically operated reversible rotary motor 62, adapted to axially adjust element 52. Motor 62 may be mounted to member 31 in fixed relation thereto, as by a pair of mounting arms 63, with the rotor of motor 62 turning about main axis 64 of member 31, and rotatively driving a screw 65 extending through and threadedly engaging an inner threaded bore within member 52. As will be apparent, the rotary movement of screw 65 by motor 62 will act to threadedly actuate member 52 axially within member 31, since member 52 is held against rotation by a reception of an upper keying lug 66 on member 52 within the top slot 34 of member 31. The operation of motor 62 is controlled by a reversing valve 67 similar to valve 60 and actuated by a manually operated control member 68.

Member 31 is movably mounted to a rotary table or support structure 69, which is in turn mounted on a vertical support 70 attached rigidly by screws 71 to the deck 72 of the boat. The rotary table 69 is mounted by suitable bearings for rotation about a vertical axis 73 relative to upstanding support 70. Rotary adjustment of member 69 about axis 73 relative to member 70 is effected by means of another rotary pneumatic motor 74 attached stationarily to the deck by support 75, and having a gear 76 engaging a circular gear 77 on member 69. Motor 74 is controlled by an associated reverse valve 77, having an actuating handle 78. The gear 76 driven by motor 74 of course turns about an axis which is parallel to and offset from axis 73.

A final adjustment of the apparatus is obtained by mounting member 31 for swinging movement about horizontal axis 79 relative to member 69. This mounting is effected by a suitable pivot connection represented at 80 in Fig. 2. For adjusting the inclination of member 31, we provide two rigid links 81 and 82 which are pivoted together and to a member 83 at 84, and which have their other ends pivoted to members 31 and 69 respectively. The member 83 may be an internally threaded nut element, threadedly engaging a screw member 85 which is rotatively driven by a pneumatic motor 86 controlled by a reversing valve 87 and its actuating handle 88. The body of motor 86 may be pivoted at 89 to the underside of member 31. It will, of course, be understood that rotary movement of screw 85 by motor 86 in either direction relative to nut 83 will cause links 81 and 82 to swing member 31 either upwardly or downwardly, to thus adjust its inclination relative to the boat. It will also be understood that each of the valve control elements 61, 68, 78 and 88, in addition to its two reversing positions, has an intermediate off position in which no fluid is admitted to the associated pneumatic motor, to thus retain that motor in a desired set position.

In using the apparatus, the first step may be to actuate tub sections 35 to the full line positions of Fig. 3, in which they will be held against opening movement by latch element 43 of Fig. 4. The net 13 is then forcibly collapsed to a small enough condition to be received within tub 12. In order to effect such collapse of the net, the user may first axially compress one of the springs 15, by sliding one of the associated discs 18 along cable 17 toward the other disc 18 at the opposite end of that spring. In order to allow this action, at least one of the discs 18 must have a loose enough fit on the cable 17 to permit such sliding movement of the disc along the cable. When one of the springs 15 has in this way been compressed axially enough to be slipped into the tub 12, the spring is inserted into the tub. Next, another of the springs 15 may be similarly compressed and placed in the tub, and the other two springs may in turn be compressed and placed in the tub, with the rest of the net being finally positioned in the tub about the compressed and circularly overlapping springs (see the representtaion of the collapsed net at position b in Fig. 1).

After the net has been collapsed and placed in the tub, the gun may be aimed as desired by actuating valve 77 to cause motor 74 to turn the gun in a proper direction, and by actuating valve 87 to cause motor 86 to set the gun to a desired inclination. Similarly, the compression of spring 51, and consequently the firing range, can be adjusted by actuation of valve 67 to cause motor 62 to adjust the spring backing element 52. To cock the gun for firing, valve 60 may be actuated to cause winch 53 to wind line 55 on drum 54, to thereby retract part 32 and tub 12 with the contained net to the Fig. 2 position (against the resistance offered by firing spring 51).

After the gun has been aimed, properly adjusted and cocked for firing toward a particular sighted school of fish, the operator releases latch mechanism 56 of Fig. 7, to allow spring 51 to rapidly move part 32 and the attached tub forwardly relative to member 31. This rapid movement of tub 12 imparts forward kinetic energy to net 13. When the tub 12 reaches the final portion of its forward travel, latch element 43 engages cam 49, and is released thereby, to allow tub sections 35 to swing under the influence of springs 41 to their broken line positions of Fig. 3. In these positions of the tub sections, the inturned upper portions 38 of the tub sections are opened outwardly far enough to allow the compressed and confined coil springs 15 of the net to spring upwardly out of the tub sections. Also, the upward movement of the bottom walls 36 of tub sections 35 ejects the net upwardly out of the tub, to assure complete freeing of the entire bulk of the net from the gun structure. The kinetic energy of the net causes it when once freed to move outwardly over the water for a substantial distance, and to then fall on the surface of the water. By the time the net reaches the water, springs 15 have by their resiliency opened the net to position c of Fig. 1. The weight of springs 15 and cables 17 causes the peripheral portion of the net to fall downwardly toward the bottom 31 of the ocean or other body of water, while the floats 30 hold the upper portion of the net in a relatively higher condition. As the net moves downwardly within the water in the Fig. 5 open condition of the net, fish are trapped beneath the net, and can not possibly escape after the springs touch bottom. Many of these fish will attempt to go toward the surface, and to do so will pass through the upper opening 21 of the conical portion of the net 20, to thus be trapped in the top part of the net. Ultimately, virtually all of the conical portion 20 of the net may rest on the floor of the ocean or other body of water, so that almost all of the fish will pass upwardly through opening 21.

When the net was fired, line 23 was of course attached to the boat at 24. After the net has been fired and has trapped most of the fish in the upper part of the net, the operator recovers the net by merely pulling inwardly on line 23. The initial portion of this pulling movement causes the line or draw string 23 to close opening 21, so that the upper portion of the net above opening 21 will then be completely closed against escape of any of the fish therefrom, and the net may then be pulled to the boat without loss of any of the fish. The fish may be finally removed from the net by again opening the net at the draw string location.

We claim:

1. Fishing apparatus comprising a fishing net adapted to be ejected by a gun structure into the water and actuable between a collapsed small dimension condition in which the net is held by the gun and an expanded condition to which the net is opened in the water, and spring means carried by said net and ejectable therewith and yieldingly urging the net to said expanded condition.

2. Fishing apparatus as recited in claim 1, in which said spring means are connected to and extend along essentially the periphery of a portion of said net and yieldingly urge said periphery outwardly to expanded condition.

3. Fishing apparatus as recited in claim 1, in which said spring means include a plurality of coil springs extending along and attached to different portions of essentially the periphery of said net and urging said periphery outwardly to expanded condition, said springs being separately compressible to reduce the net to said collapsed condition.

4. Fishing apparatus as recited in claim 1, in which said spring means are connected to and extend along essentially the periphery of a portion of said net and yieldingly urge said periphery outwardly to expanded condition, said net forming a compartment having an opening through which fish swim into the compartment, and a draw string attached to said net and adapted to close said opening while the net is in the water.

5. Apparatus usable for deep sea fishing, comprising a net adapted to be submerged to bottom depths, collapsible metallic spring means attached to the net and applying thereto radially directed forces acting to distend the net, and a flexible line attached to said net and adapted to run from the submerged net to the water surface.

6. Apparatus usable for deep sea fishing, comprising a net adapted to be submerged to bottom depths, collapsible means attached to the net and applying thereto radially directed forces acting to distend the net, said means comprising flexible means in generally circular form and metallic coil spring means acting to radially distend said flexible means, and a exible line attached to said net and adapted to run from the submerged net to the water surface.

7. A net assembly usable for deep sea fishing, comprising a lower net adapted to be submerged to bottom depths, collapsible means attached to the net and adapted to apply thereto radially directed forces acting to distend the net so that the net extends upwardly within the area of said collapsible means, an upper net forming a fish trap compartment communicating with the space covered by said lower net through an opening in the top of the lower net, buoyant means attached to said upper net and acting to elevate the net about said compartment, and a flexible line attached to said net and adapted to run from the submerged net assembly to the water surface.

References Cited in the file of this patent

UNITED STATES PATENTS

| | | |
|---|---|---|
| 335,433 | Darr | Feb. 2, 1886 |
| 482,635 | Hanish | Sept. 13, 1892 |
| 1,351,628 | Dukas | Aug. 31, 1920 |
| 1,374,757 | Napier | Apr. 12, 1921 |
| 1,565,438 | Griefe | Dec. 15, 1925 |
| 2,549,475 | Jardin | Apr. 17, 1951 |
| 2,565,955 | Dobreff | Aug. 28, 1951 |
| 2,723,481 | Schwartz | Nov. 15, 1955 |
| 2,732,647 | Byars | Jan. 31, 1956 |

FOREIGN PATENTS

| | | |
|---|---|---|
| 898,101 | France | June 26, 1944 |